United States Patent
Liu et al.

(10) Patent No.: US 10,745,510 B2
(45) Date of Patent: Aug. 18, 2020

(54) PHOSPHORYLATED POLYCONDENSATE AS HIGH EFFICIENCY WATER REDUCING AGENT AND PREPARATION METHOD THEREOF

(71) Applicants: SOBUTE NEW MATERIALS CO., LTD., Nanjing (CN); PANZHIHUA BOTE BUILDING MATERIALS CO., LTD., Nanjing (CN)

(72) Inventors: Jiaping Liu, Nanjing (CN); Qianping Ran, Nanjing (CN); Tao Wang, Nanjing (CN); Shuai Qi, Nanjing (CN); Jianfeng Ma, Nanjing (CN); Shimin Fan, Nanjing (CN); Yong Yang, Nanjing (CN)

(73) Assignees: SOBUTE MATERIALS CO., LTD, Nanjing (CN); PANZHIHUA BOTE BUILDING MATERIALS CO., LTD., Nanjing (CN)

( * ) Notice: Subject to any disclaimer, the term of this patent is extended or adjusted under 35 U.S.C. 154(b) by 82 days.

(21) Appl. No.: 16/067,018

(22) PCT Filed: Nov. 7, 2016

(86) PCT No.: PCT/CN2016/104954
§ 371 (c)(1),
(2) Date: Jun. 28, 2018

(87) PCT Pub. No.: WO2017/113992
PCT Pub. Date: Jul. 6, 2017

(65) Prior Publication Data
US 2019/0016843 A1    Jan. 17, 2019

(30) Foreign Application Priority Data

Dec. 31, 2015 (CN) .......................... 2015 1 1028434

(51) Int. Cl.
| | | |
|---|---|---|
| *C08G 12/46* | (2006.01) | |
| *C04B 24/24* | (2006.01) | |
| *C04B 24/30* | (2006.01) | |
| *C08G 12/32* | (2006.01) | |
| *C08G 14/10* | (2006.01) | |
| *C04B 103/00* | (2006.01) | |
| *C04B 103/30* | (2006.01) | |

(52) U.S. Cl.
CPC ............ *C08G 12/46* (2013.01); *C04B 24/243* (2013.01); *C04B 24/246* (2013.01); *C04B 24/305* (2013.01); *C08G 12/32* (2013.01); *C08G 14/10* (2013.01); *C04B 2103/006* (2013.01); *C04B 2103/302* (2013.01)

(58) Field of Classification Search
CPC ........ C08G 12/32; C08G 14/00; C08G 14/02; C08G 14/06; C08G 14/10; C08G 12/30; C04B 24/243; C04B 24/246; C04B 24/305; C04B 2103/006; C04B 2103/302
See application file for complete search history.

(56) References Cited

U.S. PATENT DOCUMENTS

| | | |
|---|---|---|
| 5,362,324 A | 11/1994 | Mapei |
| 5,661,206 A | 8/1997 | Tanaka et al. |
| 2011/0281975 A1* | 11/2011 | Kraus .................... C04B 24/246 524/3 |

FOREIGN PATENT DOCUMENTS

| | | |
|---|---|---|
| CN | 1167739 | 12/1997 |
| CN | 1412175 | 4/2003 |
| CN | 101066851 | 11/2007 |
| CN | 101831037 | 9/2010 |
| CN | 102171273 | 8/2011 |
| CN | 102531450 | 3/2013 |
| CN | 104031258 | 9/2014 |
| CN | 105712649 | 6/2016 |

\* cited by examiner

*Primary Examiner* — Kregg T Brooks
(74) *Attorney, Agent, or Firm* — Treasure IP Group, LLC

(57) ABSTRACT

The present invention discloses a phosphorylated polycondensate high-performance water-reducing agent with a phosphorylated melamine derivative, instead of a conventional carboxyl group or sulfonic group, as a main adsorption group. The use of aryl alkoxypolyether as a side chain of the polymer provides a strong steric effect to improve the dispersibility and dispersion-retaining properties of the polymer. A polycondensate high-performance water-reducing agent and a method for preparing the same provided by the present invention have excellent overall performance, high adaptability for current low-grade raw materials of concrete, strong market demands, and vast application prospects. Additionally, the polycondensate has an advanced preparation process provided with the characteristics of industrially scalable production, which offers the prospect of a core technology in the field of water-reducing agent of concrete so as to promote development of the industry.

6 Claims, No Drawings

PHOSPHORYLATED POLYCONDENSATE AS HIGH EFFICIENCY WATER REDUCING AGENT AND PREPARATION METHOD THEREOF

CROSS REFERENCE TO RELATED APPLICATION

This application claims priority to a PCT application PCT/CN2016/104954 filed on Nov. 7, 2016, which in turn claims priority to a Chinese Application No. CN201511028434.3, filed on Dec. 31, 2015. The PCT and Chinese Applications are incorporated herein by reference in their entireties.

BACKGROUND OF THE INVENTION

Field of the Invention

The present invention belongs to the field of chemical building materials, and more particularly, to a phosphorylated polycondensate high-performance water-reducing agent having a novel structure and a method for preparing the same.

Description of Related Art

Polycarboxylate (PCE)-based water-reducing agent, known as the 3rd generation concrete superplasticizer, has a comb-like molecular structure and very strong steric effect, and makes a breakthrough to the conventional principle for realizing dispersion of cement particles by electrostatic repulsion. Such a water-reducing agent, when used in a concrete system, has the advantages of low dosage, high water-reducing rate and being capable of improving the pore structure and compactness of concrete, and can control the slump loss of concrete and the problems such as air-entraining, regarding and bleeding of concrete. Because of its outstanding overall performance, the water-reducing agent is highly valuable to be promoted and applied, has growing market shares year by year in important projects and commercial concretes, and represents one of current high-performance water-reducing agents that are most advanced and have the highest technological content, most promising applications, and optimal overall performance.

Improvement in performance of polycarboxylic acids is always a research focus and difficulty in admixture technology, and a number of efforts such as exploration for synthesis, performance testing and characterization of applications have been made around the molecular structure of polyether macromonomers, new comonomers, and types of adsorption groups. In terms of the developmental process and the molecular structure, polycarboxylic acid water-reducing agent is mainly divided into three types below:

(1) polyester type water-reducing agent, namely, a water-reducing agent prepared by using methoxypoly(ethylene glycol) mono(metha)acrylate generated from methoxypoly(ethylene glycol) and (metha)acrylic acid as a polyoxyalkylene macromonomer. Such a water-reducing agent has the advantages of high water-reducing rate, good slump-retaining properties and good adaptability for cement;

(2) ordinary polyether type water-reducing agent, namely, a water-reducing agent prepared by using allyl polyethylene glycol or a modified product thereof as a main polyoxyalkylene macromonomer. Such a water-reducing agent has the advantages of simple synthesis process, low costs and high polymerization concentration; and (3) high-performance polyether type water-reducing agent, namely, a water-reducing agent prepared by using methallyl polyethylene glycol or a modified product thereof as a main polyoxyalkylene macromonomer. Such a water-reducing agent has the advantages of both ordinary polyether type water-reducing agent and polyester type water-reducing agent.

Current researches on modification or performance improvement of polycarboxylic acids all are based on the three types above, are relatively fixed in the system, and mainly use a carboxyl group as an adsorption group.

Patent CN1167739A discloses a method for preparing a polycarboxylic acid cement dispersant, where alkoxypolyalkylene glycol mono(metha)acrylate is prepared by subjecting alkoxypolyalkylene glycol and (metha)acrylate to transesterification reaction in the presence of a basic catalyst, and then mixed with (metha)acrylic acid and is subjected to copolymerization under the action of ammonium persulfate to prepare the polycarboxylic acid water-reducing agent. However, a large excess of (metha)acrylate is required for preparing the alkoxypolyalkylene glycol mono (metha)acrylate monomer, resulting in complicated post-treatment and increased costs of the product.

Patent CN1412175 discloses a method for preparing an allyl ether ester monomer and a method for preparing a water-reducing agent from the monomer, where allyl alcohol polyether is treated with an adsorbent material such as alumina such that the peroxide value reaches 5.0 meq/kg or less, and then is subjected to esterification with an aliphatic monocarboxylic acid to prepare the allyl ether ester monomer. Then, a copolymer with a weight average molecular weight of 13500 is prepared from this purified allyl ether ester monomer and maleic anhydride using azobisisobutyronitrile as an initiator at 80° C., and is subjected to esterification with alkylpolyalkylene glycol at 100° C. to give a cement dispersant. However, the allyl ether ester monomer has poor reaction activity, so that both water-reducing properties and slump-retaining properties of the cement dispersant are unsatisfactory.

U.S. Pat. Nos. 5,362,324 and 5,661,206 and Chinese patents CN101831037A and CN101066851A disclose a method for preparing a transesterifier-type slump-retaining agent, where a transesterifier is subjected to hydrolytic ester cleavage in a strongly alkaline medium of cement, such that a low-molecular weight polymer is slowly released, thereby improving the slump-retaining ability of cement. However, such a crosslinker has poor dispersion at an earlier stage.

Modern concrete is facing an increasingly severe situation of raw materials, the use of industrial by-product gypsum as a set-regulating agent results in higher $SO_4^{2-}$ content in the binder; wide application of a large amount of industrial solid waste such as fly ash, slag powder and coal gangue results in more complicated composition of the binder; in particular, increasingly scarce resources of high-quality sand and stone and increased mud content and water absorption of aggregate directly affect the adaptability between concrete admixtures and the binder, so that the initial fluidity and fluidity-retaining ability of concrete are considerably reduced, the promotion and application of the high-performance water-reducing agent are greatly limited, and the development of concrete technology is progressively affected.

For the current market situation in which the quality of concrete aggregates and admixtures is poor, there is a need to develop a high-adaptability water-reducing agent to make a breakthrough to the limitations of the conventional water-reducing agent, and carry out innovative researches on an adsorption group and molecular skeleton of the water-reducing agent for overall improvement of the performance, so as to provide an important support for modern concrete technology.

SUMMARY OF THE INVENTION

For the market situation in which the quality of concrete raw materials becomes poorer, low adaptability of the existing water-reducing agent, and complex preparation process of the existing water-reducing agent, or poor water-reducing properties and slump-retaining properties, the present invention provides a comb-like polymer with a phosphate group as an adsorption group, namely, a phosphorylated polycondensate high-performance water-reducing agent and a method for preparing the same. The high-performance water-reducing agent has a novel molecular structure and an excellent overall performance, particularly, strong adaptability for cement and low sensitivity to clays and sulfates. The preparation process can be used for commercial production and has broad market prospects.

The phosphorylated polycondensate high-performance water-reducing agent according to the present invention uses a phosphorylated melamine derivative, instead of a conventional carboxyl group or sulfonic group, as a main adsorption group.

The phosphorylated polycondensate high-performance water-reducing agent according to the present invention uses aryl alkoxypolyether as a side chain of the polymer to provide a strong steric effect to improve the dispersibility and dispersion-retaining properties of the polymer.

The phosphorylated polycondensate high-performance water-reducing agent according to the present invention has a molecular structure represented by the following formula I:

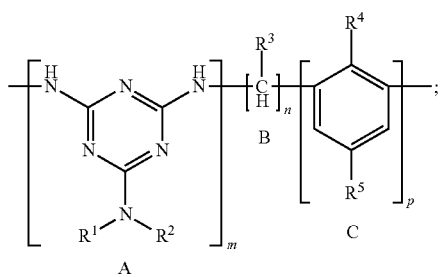

wherein the molecular structure of the polymer is formed by condensation of three monomers, phosphorylated melamine A, an aldehyde B and a aryl alkoxy compound C, and the molecular structure is a comb-like structure;

the monomers of the polymer has a mole ratio of m:n:p=1.5 to 4.5:1.8 to 3.2:1, preferably m:n:p=2.0 to 3.0:2.4 to 2.8:1;

the monomer A is phosphorylated melamine, including a monodentate compound II

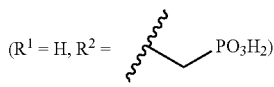

and a bidentate compound III

and is required to have one or two structures as shown below in the molecular structure I of the water-reducing agent, specifically shown in the formulas II and III:

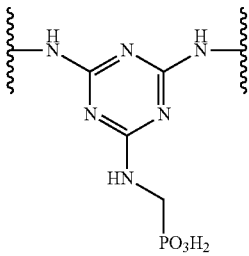

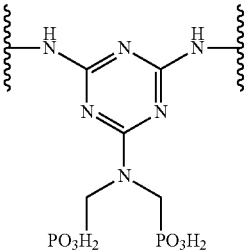

the monomer A is prepared by the classical Mannich reaction of melamine, phosphorous acid, and respectively, formaldehyde, acetaldehyde or benzaldehyde as key raw materials in the presence of an acid catalyst at a controlled molar ratio of the materials, which can be readily understood and appreciated by those skilled in the art with reference to the Name reaction or related technical information, so as to prepare the key intermediates II and III;

wherein a molar ratio of the materials is melamine: phosphorous acid:aldehyde:acid ($H^+$)=1:1.0 to 1.2:1.1 to 1.5:0.2 to 1.2, this ratio of the materials is based on a single phosphoric acid functional group, and the acid may be in a catalytic amount or stoichiometric amount;

the monomer B is conventionally one or more of formaldehyde, acetaldehyde and benzaldehyde compounds

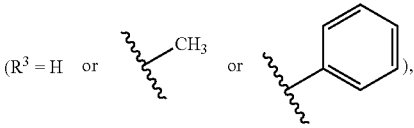

and is preferably a 37% formaldehyde solution (formalin) in terms of selection of industrial raw materials and conversion;

the monomer C is aryl alkylene polyether as a polyether side chain of the polycondensate, with a molecular weight of 1000 to 6000, preferably 2000 to 5000; and $R^4$ and $R^5$ are H, OH, $NH_2$ or phenoxypolyoxyalkylene ether or phenylaminopolyoxyalkylene ether (the polyoxyalkylene ether is formed by ring opening polymerization of an aromatic alcohol or amine with active hydrogen and ethylene oxide/propylene oxide), provided that $R^4$ and $R^5$ cannot both be H, OH or $NH_2$, and at least one of $R^4$ and $R^5$ is phenoxypolyoxyalkylene ether or phenylaminopolyoxyalkylene ether;

the monomer C may be prepared by conventional anionic alkoxylation polymerization, and this method is relatively mature in the industry of polyether macromonomers; see patents ZL200910027884.9 and ZL200910234991.9 for details; and the weight average molecular weight of the polymer is 10000 to 50000.

The method for preparing the phosphorylated polycondensate high-performance water-reducing agent according to the present invention includes subjecting the three monomers to polycondensateization in a presence of a catalyst at a pH of 1 to 3 to obtain the phosphorylated polycondensate high-performance water-reducing agent;

wherein the reaction temperature is 100 to 150° C., the reaction time is 1 to 10 h, and the reaction system uses water as solvent; the apparatus is equipped with a condenser (tube) for reflux so as to prevent dissipation of water or the aldehyde in the system to affect the reaction conditions; and the acid catalyst may be one of sulfonic acid, sulfuric acid, trifluoroacetic acid (TFAA), 4-toluene sulfonic acid (pTSA), monochloroethanoic acid (MCAA), glacial acetic acid, hydrochloric acid, and formic acid and other acids, or a mixture thereof in any ratio.

The polymerization step is divided into three specific steps: preparation of the monomer A, condensation and neutralization, which can be handled by those skilled in the art through simple modifications with reference to preparation methods of conventional melamine-based, naphthalene-based and sulfamate-based water-reducing agents, and can be accomplished using the "one-pot method".

The pH of the polymerization reaction system is adjusted with a conventional metal hydroxide such as sodium hydroxide or potassium hydroxide.

The phosphorylated polycondensate high-performance water-reducing agent according to the present invention has a novel molecular structure and synthesis method. The molecular structure contains a phosphate group and a polyether side chain. The comb-like polymer having a polyether side chain is synthesized with the conventional polycondensation method, makes a breakthrough to the conventional research system of water-reducing agent, and achieves the innovation effect in the following aspects:

(1) The polymer water-reducing agent has high adaptability. The incorporated phosphorylated melamine, as an adsorption group, makes a breakthrough to the conventional carboxyl group and sulfonic group systems. The phosphate group has strong adsorption ability. The polycondensate exhibits strong adaptability for cement and high sulfate environments, and low sensitivity to clays, which presents a great performance advantage in the current market environment in which the quality of concrete admixtures and aggregates is poor, and thus can be developed as a core technology.

(2) The overall performance is excellent. The polymer is of a comb-like structure, similar to the molecular structure of a polycarboxylic acid high-performance water-reducing agent and having very strong steric effect, such that the polymer has excellent water-reducing and slump-retaining properties, and basic performance equal to or even greater than that of the polycarboxylic acid high-performance water-reducing agent.

(3) The preparation process is advanced. The raw materials selected for the process are inexpensive, and the synthesis process is simple and feasible and has high polycondensation efficiency and low production energy consumption, and can be used for commercial production.

A polycondensate high-performance water-reducing agent and a method for preparing the same provided by the present invention have excellent overall performance, high adaptability for existing low-grade raw materials of concrete, strong market demands, and vast application prospects. Additionally, the polycondensate has an advanced preparation process provided with the characteristics of industrially scalable production, which offers the prospect of a core technology in the field of water-reducing agent of concrete so as to promote development of the industry.

DETAILED DESCRIPTION OF THE INVENTION

The following examples are provided to describe in greater detail the molecular structure and preparation process of a polycondensate high-performance water-reducing agent of the present invention, and these examples are given for illustrative purpose to enable those skilled in the art to understand and implement the content of the present invention, and are not intended to limit the scope of the present invention. Any equivalent change or modification made according to the spirit and essence of the present invention shall fall within the protection scope of the present invention.

Test conditions of molecular weight: the molecular weight of the polycondensates in all the examples of the present invention was determined using aqueous gel-permeation chromatography (GPC) under the following experimental conditions:

gel column: Shodex SB806+803 columns in series;
mobile phase: 0.1M $NaNO_3$ aqueous solution;
mobile phase velocity: 1.01 ml/min;
injection: 20 μl 0.5% aqueous solution;
detector: Shodex RI-71 differential refractive index detector;
standard: PEG GPC calibration standards (Sigma-Aldrich, molecular weight 1010000, 478000, 263000, 118000, 44700, 18600, 6690, 1960, 628, 232).

Synthesis parameters of the monomer A in each example are shown in Table 1.

TABLE 1

| | Synthesis parameters of monomer A | |
| --- | --- | --- |
| | Monomer A | Molar ratio of materials melamine:phosphorous acid:aldehyde:H⁺ |
| Sample 1 | Monosubstituted II | 1:1.05:1.2:0.8 |

$R^1 = H, R^2 =$ 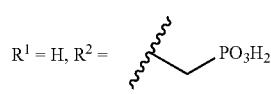

TABLE 1-continued

Synthesis parameters of monomer A

| | Monomer A | Molar ratio of materials melamine:phosphorous acid:aldehyde:H+ |
|---|---|---|
| Sample 2 | Monosubstituted II<br>$R^1 = H$, $R^2 = {-}CH_2{-}CH_2{-}PO_3H_2$ | 1:1.1:1.05:1.0 |
| Sample 3 | Monosubstituted II<br>$R^1 = H$, $R^2 = {-}CH_2{-}CH_2{-}PO_3H_2$ | 1:1.0:1.5:0.2 |
| Sample 4 | Monosubstituted II<br>$R^1 = H$, $R^2 = {-}CH_2{-}CH_2{-}PO_3H_2$ | 1:1.2:1.0:1.2 |
| Sample 5 | Disubstituted III<br>$R^1 = R^2 = {-}CH_2{-}CH_2{-}PO_3H_2$ | 1:1.1:1.3:1.0 |
| Sample 6 | Disubstituted<br>$R^1 = R^2 = {-}CH_2{-}CH_2{-}PO_3H_2$ | 1:1.0:1.1:1.2 |
| Comparative sample1 | Monosubstituted II<br>$R^1 = H$, $R^2 = {-}CH_2{-}CH_2{-}PO_3H_2$ | 1:0.6:0.8:0.1 |
| Comparative sample2 | Monosubstituted II<br>$R^1 = H$, $R^2 = {-}CH_2{-}CH_2{-}PO_3H_2$ | 1:1.5:1.8:1.6 |

Synthesis parameters of a sample of the water-reducing agent in each example are shown in Table 2.

TABLE 2

Synthesis parameters of modified water-reducing agents

| | Monomer A | Monomer B | Monomer C | Monomer molar ratio | Molecular weight of polymer ($10^4$) |
|---|---|---|---|---|---|
| Sample 1 | Monosubstituted II<br>$R^1 = H$, $R^2 = {-}CH_2{-}CH_2{-}PO_3H_2$ | Formaldehyde | Phenoxypolyoxyalkylene ether<br>Mw = 2500 | m:n:p = 2.4:2.6:1 | 25000 |

TABLE 2-continued

Synthesis parameters of modified water-reducing agents

| | Monomer A | Monomer B | Monomer C | Monomer molar ratio | Molecular weight of polymer ($10^4$) |
|---|---|---|---|---|---|
| Sample 2 | Monosubstituted II $R^1$ = H, $R^2$ = 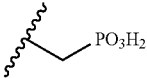$PO_3H_2$ | Formaldehyde | Phenoxypolyoxyalkylene ether Mw = 4500 | m:n:p = 3.0:2.8:1 | 24000 |
| Sample 3 | Monosubstituted II $R^1$ = H, $R^2$ = 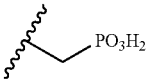$PO_3H_2$ | Formaldehyde | p-hydroxylphenoxypolyoxyalkylene ether Mw = 3500 | m:n:p = 1.5:1.8:1 | 12000 |
| Sample 4 | Monosubstituted II $R^1$ = H, $R^2$ = 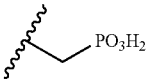$PO_3H_2$ | Formaldehyde | p-aminophenoxypolyoxyalkylene ether Mw = 4000 | m:n:p = 4.5:3.2:1 | 46000 |
| Sample 5 | Disubstituted III $R^1$ = $R^2$ = 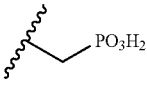$PO_3H_2$ | Acetaldehyde | p-hydroxylphenylainopolyoxyalkylene ether Mw = 6000 | m:n:p = 2.0:2.5:1 | 32000 |
| Sample 6 | Disubstituted $R^1$ = $R^2$ = 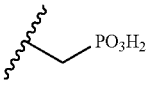$PO_3H_2$ | Benzaldehyde | Phenylaminopolyoxyalkylene ether Mw = 1000 | m:n:p = 2.4:2.8:1 | 38000 |
| Comparative sample 1 | Monosubstituted II $R^1$ = H, $R^2$ = 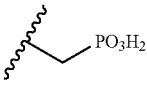$PO_3H_2$ | Formaldehyde | Phenoxypolyoxyalkylene ether Mw = 750 | m:n:p: = 0.8:1.2:1 | 7500 |
| Comparative sample 2 | Monosubstituted II $R^1$ = H, $R^2$ = 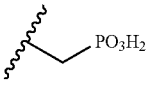$PO_3H_2$ | Formaldehyde | Phenoxypolyoxyalkylene ether Mw = 7000 | m:n:p = 5.0:3.8:1 | 64500 |

Note:
the dosing ratios in these steps all refer to a molar ratio of monomer A, monomer B and monomer C.

Synthesis Example 1

(1) Preparation of Monomer A 126.02 g (1.0 mol) melamine, 86.10 g (1.05 mol) phosphorous acid and 100 ml water were placed into a 1000 ml reaction flask, 78.4 g (0.8 mol) sulfuric acid was added, the temperature was raised to 100° C. for 10 min, 97.30 g (1.2 mol) of a 37% aqueous formaldehyde solution was dropwise added, a condenser tube was installed, and the reaction was heated to reflux for 3 h and cooled for later use.

(2) Condensation 250 g (0.1 mol) of a monomer C (phenoxypolyoxyalkylene ether) and 52.8 g (0.24 mol) of the monomer A (monosubstituted phosphorylated melamine) were sequentially added in a 1000 ml round-bottomed flask, the temperature was raised to 80° C., 21.08 g (0.26 mol) of a 37% aqueous formaldehyde solution was dropwise added, and the reaction was maintained at 120° C. for 6 h.

(3) Neutralization 34.67 g (0.26 mol) of a 30% sodium hydroxide solution was added and 480 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 25000.

Synthesis Example 2

(1) Preparation of Monomer A 126.05 g (1.0 mol) melamine, 90.20 g (1.1 mol) phosphorous acid and 100 ml water were placed into a 1000 ml reaction flask, 98.0 g (1.0 mol) sulfuric acid was added, the temperature was raised to 100° C. for 10 min, 85.14 g (1.05 mol) of a 37% aqueous formaldehyde solution was dropwise added, a condenser tube was installed, and the reaction was heated to reflux for 3 h and cooled for later use.

(2) Condensation 450 g (0.1 mol) of a monomer C (phenoxypolyoxyalkylene ether) and 66.0 g (0.3 mol) of the monomer A (monosubstituted phosphorylated melamine) were sequentially added in a 2000 ml round-bottomed flask, the temperature was raised to 80° C., 22.70 g (0.28 mol) of a 37% aqueous formaldehyde solution was dropwise added, and the reaction was maintained at 110° C. for 5 h.

(3) Neutralization 41.3 g (0.31 mol) of a 30% sodium hydroxide solution was added and 800 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 24000.

Synthesis Example 3

(1) Preparation of Monomer A 126.0 g (1.0 mol) melamine, 82.06 g (1.0 mol) phosphorous acid and 100 ml water were placed into a 1000 ml reaction flask, 19.6 g (0.2 mol) sulfuric acid was added, the temperature was raised to 100° C. for 10 min, 121.62 g (1.5 mol) of a 37% aqueous formaldehyde solution was dropwise added, a condenser tube was installed, and the reaction was heated to reflux for 3.5 h and cooled for later use.

(2) Condensation 350 g (0.1 mol) of a monomer C (p-hydroxylphenoxypolyoxyalkylene ether) and 33.0 g (0.15 mol) of the monomer A (monosubstituted phosphorylated melamine) were sequentially added in a 2000 ml round-bottomed flask, the temperature was raised to 80° C., 14.60 g (0.18 mol) of a 37% aqueous formaldehyde solution was dropwise added, and the reaction was maintained at 130° C. for 7 h.

(3) Neutralization 25.33 g (0.15 mol) of a 30% sodium hydroxide solution was added and 600 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 12000.

Synthesis Example 4

(1) Preparation of Monomer A 126.04 g (1.0 mol) melamine, 98.4 g (1.2 mol) phosphorous acid and 100 ml water were placed into a 1000 ml reaction flask, 117.6 g (1.2 mol) sulfuric acid was added, the temperature was raised to 100° C. for 10 min, 81.08 g (1.0 mol) of a 37% aqueous formaldehyde solution was dropwise added, a condenser tube was installed, and the reaction was heated to reflux for 3 h and cooled for later use.

(2) Condensation 400 g (0.1 mol) of a monomer C (p-aminophenoxypolyoxyalkylene ether) and 99.0 g (0.45 mol) of the monomer A (monosubstituted phosphorylated melamine) were sequentially added in a 2000 ml round-bottomed flask, the temperature was raised to 80° C., 14.60 g (0.18 mol) of a 37% aqueous formaldehyde solution was dropwise added, and the reaction was maintained at 110° C. for 6 h.

(3) Neutralization 38.67 g (0.29 mol) of a 30% sodium hydroxide solution was added and 775 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 46000.

Synthesis Example 5

(1) Preparation of Monomer A 126.03 g (1.0 mol) melamine, 180.4 g (2.2 mol) phosphorous acid and 150 ml water were placed into a 1000 ml reaction flask, 196 g (2.0 mol) sulfuric acid was added, the temperature was raised to 100° C. for 10 min, 210.81 g (2.6 mol) of a 37% aqueous formaldehyde solution was dropwise added, a condenser tube was installed, and the reaction was heated to reflux for 4 h and cooled for later use.

(2) Condensation 600 g (0.1 mol) of a monomer C (p-hydroxylphenylaminopolyoxyalkylene ether) and 62.8 g (0.2 mol) of the monomer A (disubstituted phosphorylated melamine) were sequentially added in a 2000 ml round-bottomed flask, the temperature was raised to 80° C., 27.5 g (0.25 mol) of a 40% aqueous acetaldehyde solution was dropwise added, and the reaction was maintained at 120° C. for 6 h.

(3) Neutralization 82.67 g (0.62 mol) of a 30% sodium hydroxide solution was added and 1010 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 32000.

Synthesis Example 6

(1) Preparation of Monomer A 126.06 g (1.0 mol) melamine, 164.0 g (2.0 mol) phosphorous acid and 150 ml water were placed into a 1000 ml reaction flask, 215.6 g (2.2 mol) sulfuric acid was added, the temperature was raised to 100° C. for 10 min, 194.59 g (2.4 mol) of a 37% aqueous formaldehyde solution was dropwise added, a condenser tube was installed, and the reaction was heated to reflux for 4 h and cooled for later use.

(2) Condensation 100 g (0.1 mol) of a monomer C (phenylaminopolyoxyalkylene ether) and 75.36 g (0.24 mol) of the monomer A (disubstituted phosphorylated melamine) were sequentially added in a 1000 ml round-bottomed flask, the temperature was raised to 80° C., 29.68 g (0.28 mol) of a benzaldehyde solution was dropwise added, and the reaction was maintained at 120° C. for 8 h.

(3) Neutralization 85.33 g (0.64 mol) of a 30% sodium hydroxide solution was added and 350 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 38000.

Comparative Example 1

(1) Preparation of Monomer A 126.00 g (1.0 mol) melamine, 49.2 g (0.6 mol) phosphorous acid and 100 ml water were placed into a 1000 ml reaction flask, 9.8 g (0.1 mol) sulfuric acid was added, the temperature was raised to 100° C. for 10 min, 64.86 g (0.8 mol) of a 37% aqueous formaldehyde solution was dropwise added, a condenser tube was installed, and the reaction was heated to reflux for 3 h and cooled for later use.

(2) Condensation 75 g (0.1 mol) of a monomer C (phenoxypolyoxyalkylene ether) and 17.6 g (0.08 mol) of the monomer A (monosubstituted phosphorylated melamine) were sequentially added in a 500 ml round-bottomed flask, the temperature was raised to 80° C., 9.73 g (0.12 mol) of a 37% aqueous formaldehyde solution was dropwise added, and the reaction was maintained at 160° C. for 10 h.

(3) Neutralization 10.67 g (0.08 mol) of a 30% sodium hydroxide solution was added and 150 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 7500.

Comparative Example 2

(1) Preparation of Monomer A 126.01 g (1.0 mol) melamine, 123 g (1.5 mol) phosphorous acid and 100 ml water were placed into a 1000 ml reaction flask, 156.8 g (1.6 mol) sulfuric acid was added, the temperature was raised to 100° C. for 10 min, 145.95 g (1.8 mol) of a 37% aqueous formaldehyde solution was dropwise added, a condenser tube was installed, and the reaction was heated to reflux for 3 h and cooled for later use.

(2) Condensation 700 g (0.1 mol) of a monomer C (phenoxypolyoxyalkylene ether) and 110 g (0.5 mol) of the monomer A (monosubstituted phosphorylated melamine) were sequentially added in a 2000 ml round-bottomed flask, the temperature was raised to 80° C., 30.81 g (0.38 mol) of a 37% aqueous formaldehyde solution was dropwise added, and the reaction was maintained at 120° C. for 8 h.

(3) Neutralization 49.33 g (0.47 mol) of a 30% sodium hydroxide solution was added and 1250 g water was added to adjust the system to a pH=8 to 9, to prepare a high-performance polycondensate water-reducing agent at a weight concentration of about 40%, as a clear light brown viscous liquid. The polycondensate was determined by aqueous gel-permeation chromatography to have a weight average molecular weight of 64500.

Application Example 1

To evaluate dispersibility of the high-performance polycondensate water-reducing agent prepared in the present invention for cement paste, testing of fluidity of cement paste was performed according to the GB/T8077-2000 standard. The experimental results are shown in Table 3.

In all the application examples of the present invention, unless otherwise stated, the cement used was Onoda 52.5R.P.II cement, the sand was medium sand having a fineness modulus Mx=2.6, and the stone was continuously graded broken stone having a particle size of 5 to 20 mm. Testing of fluidity of cement paste was preformed with reference to the GB/T8077-2000 standard, where 87 g of the water addition was used and the fluidity of cement paste was determined on a flat glass after stirring for 3 min. Determination of slump and slump loss was performed with reference to related provisions in JC473-2001 "Pumping Aid for Concrete".

TABLE 3

Fluidity of cement pastes of samples

| Sample No. | Solid content/ wt % | Fluidity of paste/mm | |
|---|---|---|---|
| | | 0 min | 60 min |
| Sample 1 | 0.12 | 250 | 255 |
| Sample 2 | 0.12 | 262 | 257 |
| Sample 3 | 0.12 | 246 | 248 |
| Sample 4 | 0.12 | 252 | 256 |
| Sample 5 | 0.12 | 237 | 230 |
| Sample 6 | 0.12 | 247 | 240 |
| Comparative sample1 | 0.12 | 202 | 158 |
| Comparative sample2 | 0.12 | 185 | 178 |
| Commercial PCA1 | 0.12 | 248 | 225 |
| Commercial PCA2 | 0.12 | 252 | 218 |

The data in Table 3 shows that the polycondensate water-reducing agents synthesized according to the preparation method of the present invention have excellent water-reducing and slump-retaining properties, and at a same dosage of 0.12%, compared to the commercial high-performance polycarboxylic acid water-reducing agents (PCA1 and PCA2), have an equivalent initial fluidity of cement paste, but have significantly better 60-minute slump retention, indicating that the polycondensate has excellent dispersion properties and dispersion-retaining properties of cement paste.

The results from the control samples show that when the ratio of the materials diverges too much from the suggested range, the molecular weight of the polymer is too large or too small, so that the initial fluidity of cement paste of the samples is smaller and the loss increases. Therefore, the new polycondensate water-reducing agent provided by the present invention has excellent dispersion properties and dispersion-retaining properties of cement paste that are initially equivalent to those of the polycarboxylic acid water-reducing agent, and significantly better slump retention that is far superior to that of conventional naphthalene-based, amino, aliphatic, and melamine-based water-reducing agents.

Application Example 2

To evaluate adaptability of the polycondensate water-reducing agent of the present invention for cement, initial fluidity of cement paste is tested according to the method of determining fluidity of cement paste in GB/T8077-2000 "Methods for testing uniformity of concrete admixture", using 300 g of cement, 87 g of water addition, and self-provided and commercial polycarboxylic acid (PCA) water reducing agents as control samples, and using a paste mixer. The test results are shown in Table 4.

TABLE 4

Adaptability of samples for various cements

| | Solid content/ wt % | Fluidity of cement paste/mm | | | | |
|---|---|---|---|---|---|---|
| | | Onoda cement | Helin cement | Conch cement | Jidong Cement | Qilianshan Cement |
| Sample 1 | 0.12 | 246 | 252 | 240 | 239 | 233 |
| Sample 2 | 0.12 | 251 | 248 | 242 | 246 | 231 |
| Sample 3 | 0.12 | 238 | 241 | 236 | 233 | 227 |
| Sample 4 | 0.12 | 240 | 245 | 241 | 236 | 230 |
| Sample 5 | 0.12 | 236 | 242 | 232 | 230 | 228 |
| Sample 6 | 0.12 | 234 | 240 | 231 | 232 | 227 |
| Comparative sample1 | 0.12 | 190 | 196 | 181 | 173 | 156 |
| Comparative sample2 | 0.12 | 167 | 185 | 176 | 168 | 152 |
| Commercial PCA1 | 0.12 | 232 | 245 | 210 | 162 | 113 |
| Commercial PCA2 | 0.12 | 218 | 235 | 176 | 169 | 121 |

The data in Table 4 shows that the polycondensate water-reducing agents provided by the present invention have good adaptability for cement, and exhibit stable fluidity of cement paste among cements produced in different regions.

In contrast, the initial fluidity of cement paste of the control samples is low, but relatively instable among different cements. In addition, the commercial polycarboxylic acid water-reducing agents (PCA) exhibit large fluctuation among different cements and have poor adaptability for cement.

Application Example 3

To evaluate adaptability of the polycondensate of the present invention for clay, initial fluidity of paste is tested according to a method of determining fluidity of cement paste in GB/T8077-2000 "Methods for testing uniformity of concrete admixture", using 300 g of cement (Helin cement), 87 g of water addition, respectively 0.5% and 1% of montmorillonite based on the binder, and self-provided polycondensate water-reducing agent and polycarboxylic acid (PCA) water reducing agent as control samples, and using a paste mixer. The test results are shown in Table 5.

TABLE 5

Clay resistance test of samples

| | Solid content/ wt % | Fluidity of cement paste/mm | | |
|---|---|---|---|---|
| | | Initial | Mixed with 0.5% montmorillonite | Mixed with 1.0% montmorillonite |
| Sample 1 | 0.12 | 248 | 240 | 233 |
| Sample 2 | 0.12 | 240 | 236 | 232 |
| Sample 3 | 0.12 | 235 | 240 | 241 |
| Sample 4 | 0.12 | 248 | 245 | 246 |
| Sample 5 | 0.12 | 236 | 246 | 242 |
| Sample 6 | 0.12 | 228 | 220 | 232 |
| Comparative sample1 | 0.12 | 203 | 195 | 186 |
| Comparative sample2 | 0.12 | 210 | 203 | 201 |
| Commercial PCA1 | 0.12 | 226 | 196 | 102 |
| Commercial PCA2 | 0.12 | 235 | 203 | 110 |

The data in Table 5 shows that the polycondensate water-reducing agents provided by the present invention have resistance to montmorillonite, and when mixed with montmorillonite at 0.5% and 1.0% of the amount of the adhesive cement respectively, have an equivalent slump flow without significant decrease in terms of fluidity of paste compared to that without montmorillonite; the control samples all exhibit low initial fluidity due to differences from the samples in segment structure and molecular weight, and when mixed with respective contents of montmorillonite, exhibit decreased slump flow values to a different extent; and the commercial polycarboxylic acid water-reducing agent (PCA) exhibits fluidity of paste that is rapidly decreased with increase in dosage of montmorillonite by even above 50%. In the market environment in which the quality of concrete aggregates and admixtures gradually becomes poor, the polycondensate water-reducing agent has vast engineering application prospects and the clay resistance thereof will be gradually recognized by the market.

Application Example 4

To evaluate adaptability of the polycondensate of the present invention for sulfate, initial fluidity of paste is tested according to a method of determining fluidity of cement paste in GB/T8077-2000 "Methods for testing uniformity of concrete admixture", using 300 g of cement (Helin cement), 87 g of water addition, respectively 0.5% and 1% of sodium sulfate based on the binder, and self-provided and commercial melamine (SM)-based water reducing agents as control samples, and using a paste mixer. The test results are shown in Table 6.

TABLE 6

Sulfate resistance test of samples

| | Solid content/ wt % | Fluidity of cement paste/mm | | |
|---|---|---|---|---|
| | | Initial | Mixed with 0.5% sodium sulfate | Mixed with 1.0% sodium sulfate |
| Sample 1 | 0.12 | 248 | 245 | 243 |
| Sample 2 | 0.12 | 258 | 253 | 249 |

TABLE 6-continued

Sulfate resistance test of samples

| | Solid content/ wt % | Fluidity of cement paste/mm | | |
|---|---|---|---|---|
| | | Initial | Mixed with 0.5% sodium sulfate | Mixed with 1.0% sodium sulfate |
| Sample 3 | 0.12 | 234 | 236 | 232 |
| Sample 4 | 0.12 | 246 | 243 | 236 |
| Sample 5 | 0.12 | 238 | 231 | 226 |
| Sample 6 | 0.12 | 236 | 242 | 235 |
| Comparative sample1 | 0.12 | 215 | 211 | 198 |
| Comparative sample2 | 0.12 | 204 | 206 | 200 |
| Commercial PCA1 | 0.12 | 229 | 178 | 130 |
| Commercial PCA2 | 0.12 | 235 | 186 | 115 |

The data in Table 6 shows that the polycondensate water-reducing agents provided by the present invention have resistance to interference from sulfate ions, and since the adsorption ability of phosphate ions is larger than that of sulfonate ions, in the cement paste system, when mixed with sodium sulfate at 0.5% and 1% of the amount of the adhesive cement respectively, there is no significant decrease in slump flow in terms of fluidity of paste compared to that without the sulfate salt; and the commercial polycarboxylic acid water-reducing agent (PCA) exhibits decreased fluidity of paste to a certain degree with increase in dosage of the sulfate salt, which indicates that competitive adsorption of sulfate ions with respect to the polycarboxylic acid water-reducing agent occurs on the surface of cement particles. In a high-sulfate cement system in which the quality of concrete admixtures is poor, the polycondensate water-reducing agent has potential and vast application prospects because of resistance to sulfates.

Application Example 5

The indexes such as water-reducing rate, air content and slump-retaining ability of the polycondensate water-reducing agent were measured, according to the test requirements of high-performance water-reducing agent in the GB8076-2008 standard—"Concrete Admixtures", using Helin cement, machine-made sand having a mud content of 1.8% and a fineness modulus of 3.3, and continuously graded broken stone having a mud content of 0.6% and nominal particle sizes of 5-10 mm and 10-20 mm, in the mixing ratio specified in Table 7. The results are shown in Table 8.

TABLE 7

Mixing ratio of concrete for testing

| Raw materials | Cement | Fly ash | Slag powder | Machine-made sand | 5-10 mm stone | 10-20 mm stone | Water |
|---|---|---|---|---|---|---|---|
| Mixing ratio, Kg/m³ | 240 | 85 | 75 | 886 | 380 | 570 | 174 |

TABLE 8

Results of performance testing of polycondensate water-reducing agent

| Sample name | Solid content (%) | Water-reducing rate (%) | Air content (%) | Slump (mm) | | Slump flow (mm) | |
|---|---|---|---|---|---|---|---|
| | | | | Initial | After 1 h | Initial | After 1 h |
| Sample 1 | 0.12 | 29.2 | 3.8 | 215 | 193 | 468 | 432 |
| Sample 2 | 0.12 | 28.6 | 3.6 | 220 | 189 | 472 | 441 |
| Sample 3 | 0.12 | 27.2 | 3.5 | 213 | 178 | 465 | 431 |
| Sample 4 | 0.12 | 28.3 | 3.7 | 206 | 192 | 457 | 429 |
| Sample 5 | 0.12 | 27.9 | 4.1 | 214 | 196 | 469 | 438 |
| Sample 6 | 0.12 | 28.4 | 3.9 | 221 | 186 | 476 | 445 |
| Comparative sample1 | 0.12 | 20.3 | 2.3 | 175 | 152 | 410 | / |
| Comparative sample2 | 0.12 | 19.6 | 2.1 | 163 | 146 | 403 | / |
| Commercial PCA1 | 0.12 | 27.9 | 3.6 | 182 | / | 412 | / |
| Commercial PCA2 | 0.12 | 28.5 | 3.8 | 193 | / | 423 | / |

Note:
/ indicates that concrete has no slump and slump flow values

The data of flowability of concrete in Table 8 show that under the conditions of machine-made sand having a mud content of 1.8% and stone having a mud content of 0.6% as aggregates, the newly synthesized polycondensate water-reducing agents exhibit better slump values and slump-retaining ability than that of the commercial polycarboxylic acid (PCA) water reducing agents, which indicates that the polycondensate water-reducing agent has good adaptability for machine-made sand and stone having a high mud content and has obvious anti-mud effect.

The polycondensate water-reducing agent provided by the present invention has a novel structure, simple preparation process and low material costs, and uses the incorporated phosphate group, in place of conventional carboxyl group and sulfonic group, as a main adsorption group, such that the overall performance of the conventional water-reducing agent is improved. The polycondensate water-reducing agent exhibits good adaptability for cement, resistance to clays and resistance to competitive adsorption of sulfate ions, and has strong advantages and vast market prospects in the current market environment in which the quality of concrete admixtures and aggregates is poor.

What is claimed is:
1. A phosphorylated polycondensate high-performance water-reducing agent, having a molecular structure represented by the following formula I:

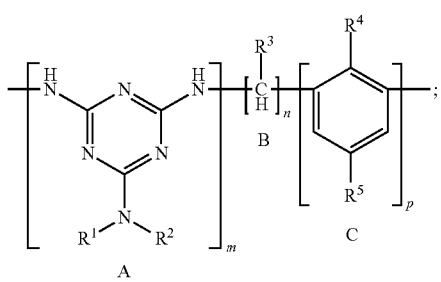

wherein the molecular structure of the polymer comprises three building blocks A, B, and C, formed by condensation of the corresponding monomers phosphorylated melamine A, an aldehyde B and an aryl alkoxy compound C, and the molecular structure is a comb-like structure;
the three monomers has a mole ratio of m:n:p=1.5 to 4.5:1.8 to 3.2:1;
the monomer A is phosphorylated melamine having a structure selected from the following monodentate structure II and bidentate structure III;

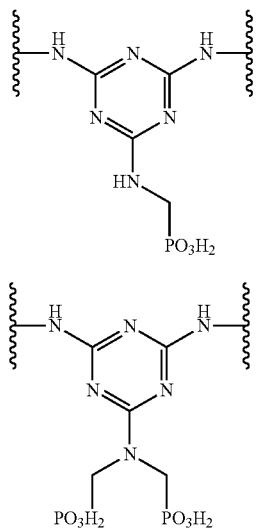

the monomer B is one of formaldehyde, acetaldehyde and benzaldehyde compounds, or a mixture thereof in any ratio;
the monomer C is either a phenoxypolyoxyalkylene ether or a phenylaminopolyoxyalkylene ether, and monomer C has a molecular weight (Mw) of 1000 to 6000, wherein $R^4$ and $R^5$ are H, OH, $NH_2$ or polyether side chain moieties of the phenoxypolyoxyalkylene ether or phenylaminopolyoxyalkylene ether, provided that $R^4$ and $R^5$ cannot both be H, OH or $NH_2$; and
the phosphorylated polycondensate high-performance water-reducing agent has a weight average molecular weight of 10000 to 50000.

2. The phosphorylated polycondensate high-performance water-reducing agent of claim 1, wherein the monomer A is prepared by the Mannich reaction of melamine, phosphorous acid, and formaldehyde, in the presence of an acid catalyst;
wherein a molar ratio of the materials is melamine: phosphorous acid:formaldehyde:acid ($H^+$)=1:1.0 to 1.2:1.1 to 1.5:0.2 to 1.2.

3. The phosphorylated polycondensate high-performance water-reducing agent of claim 1, wherein the monomer B is formaldehyde.

4. A method for preparing the phosphorylated polycondensate high-performance water-reducing agent of claim 1, comprising subjecting the three monomers to polycondensation in a presence of an acid catalyst at a pH of 1 to 3 to obtain the phosphorylated polycondensate high-performance water-reducing agent;
wherein the reaction temperature is 100 to 150° C., the reaction time is 1 to 10 h, and the reaction system uses water as solvent; the apparatus is equipped with a condenser (tube) for reflux so as to prevent dissipation of water or the aldehyde in the system to affect the reaction conditions; and
the acid catalyst is selected from sulfonic acid, sulfuric acid, trifluoroacetic acid (TFAA), 4-toluene sulfonic acid (pTSA), monochloroethanoic acid (MCAA), glacial acetic acid, hydrochloric acid, and formic acid, or a mixture thereof in any ratio.

5. The method of claim 4, wherein the preparation specifically comprises three steps: preparation of the monomer A, the polycondensation and neutralization, wherein the neutralization uses a pH adjusting agent selected from sodium hydroxide and potassium hydroxide.

6. The phosphorylated polycondensate high-performance water-reducing agent of claim 1, wherein the three monomers has a mole ratio of m:n:p=2.0 to 3.0:2.4 to 2.8:1.

* * * * *